United States Patent
Liu et al.

(10) Patent No.: US 7,382,584 B2
(45) Date of Patent: Jun. 3, 2008

(54) METHOD TO INCREASE CCP-CPP GMR OUTPUT BY THERMOELECTRIC COOLING

(75) Inventors: Yue Liu, Fremont, CA (US); Daniel G. Abels, San Francisco, CA (US); Moris Dovek, San Jose, CA (US); Min Li, Dublin, CA (US); Pokang Wang, San Jose, CA (US); Mao-Min Chen, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 270 days.

(21) Appl. No.: 11/175,932

(22) Filed: Jul. 6, 2005

(65) Prior Publication Data
US 2007/0008656 A1    Jan. 11, 2007

(51) Int. Cl.
  G11B 5/39    (2006.01)
  F25D 23/12   (2006.01)
  H01L 35/28   (2006.01)
  G01R 33/02   (2006.01)

(52) U.S. Cl. .................... 360/313; 360/324; 62/259.2; 136/203; 324/252; 700/299

(58) Field of Classification Search .................. None
See application file for complete search history.

(56) References Cited

U.S. PATENT DOCUMENTS

| | | | |
|---|---|---|---|
| 5,627,704 A | 5/1997 | Lederman et al. | 360/113 |
| 5,668,688 A | 9/1997 | Dykes et al. | 360/113 |
| 5,965,840 A * | 10/1999 | Nagarajan et al. | 136/203 |
| 6,353,318 B1 | 3/2002 | Sin et al. | 324/252 |
| 6,597,544 B2 | 7/2003 | Ghoshal | 360/317 |
| 2004/0233584 A1 | 11/2004 | Lin et al. | |
| 2005/0052789 A1 | 3/2005 | Zhang et al. | 360/324.2 |
| 2005/0111142 A1* | 5/2005 | Oshima | 360/313 |

OTHER PUBLICATIONS

*Thermoelectric Power of Metals*, by Blatt, et al., 1976, Plenum Press, New York, pp. 1-7.
Co-pending U.S. Appl. No. 10/443,358, filed May 22, 2003, Lin, et al., "Device With Thermo-electric Cooling".

* cited by examiner

*Primary Examiner*—A. J. Heinz
(74) *Attorney, Agent, or Firm*—Saile Ackerman LLC; Stephen B. Ackerman

(57) ABSTRACT

The problem of increasing the output signal from a CCP-CPP GMR device without having it overheat has been overcome by placing materials that have different thermoelectric potentials on opposing sides of the spacer layer. Heat from the hot junction is removed at the substrate, which acts as a heat sink, resulting in a net local cooling of the confined current spacer layer, enabling it to operate at both higher input voltage increased reliability.

20 Claims, 1 Drawing Sheet

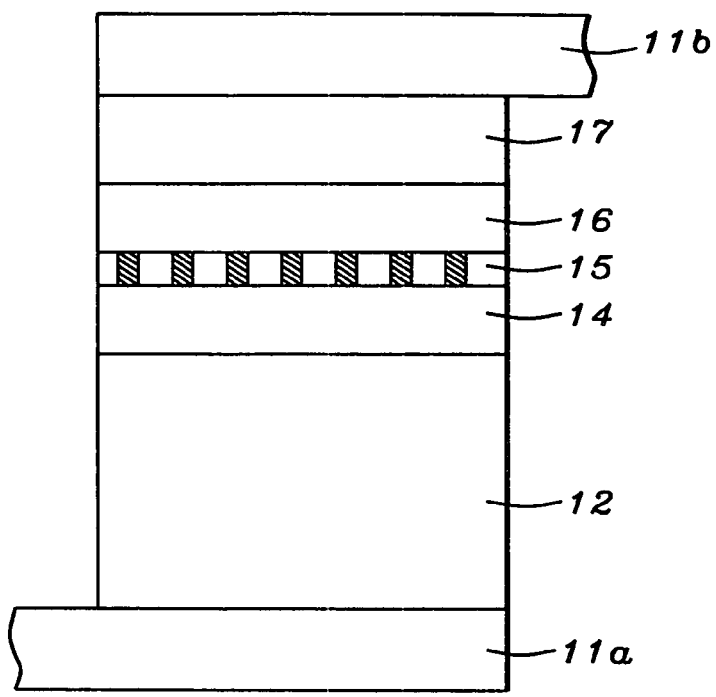
FIG. 1 - Prior Art
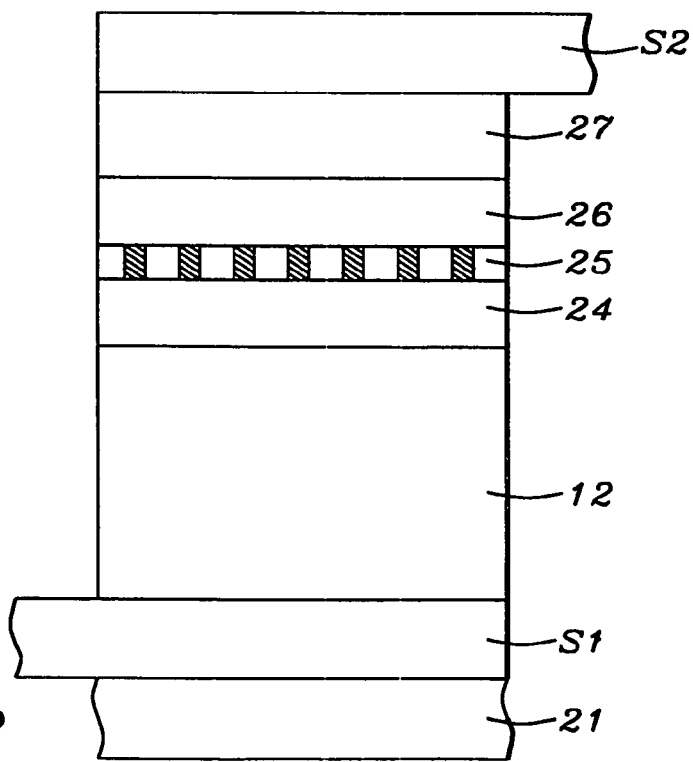
FIG. 2

METHOD TO INCREASE CCP-CPP GMR OUTPUT BY THERMOELECTRIC COOLING

FIELD OF THE INVENTION

The invention relates to the general field of device arrays, particularly memory read heads and most particularly CCP (current confined path) CPP (current perpendicular to plane) GMR (giant magneto-resistance) devices with reference to allowing higher operating voltage and improved reliability by providing very local cooling.

BACKGROUND OF THE INVENTION

CCP-CPP GMR read heads are considered as promising candidates for 180 Gb/in$^2$ and higher magnetic recording densities. This increase in recording density requires the reduction of the read head dimensions. For example, for 180 Gb/in$^2$, dimensions around 0.1×0.1 microns are required. A CPP read head can be considered functional only if a significant output voltage, Vout, can be achieved when the head senses the magnetic field of a recorded medium. If DR/R is defined as the percentage resistance change, at constant voltage, under the magnetic field for the sensor and V is the voltage applied across the sensor (BHV), then Vout=DR/R×V.

Almost all attempts by the prior art to increase Vout have focused on ways to increase film DR/R since it has been assumed that V was already at its maximum value, any further increases being expected to lead to unacceptable increases in the operating temperature of the device. In particular, said increases in temperature would occur within the current confined paths (see 15 in FIG. 1) and/or due to breakdowns within the nano-oxide layer. Since DR/R decreases with temperature, this implied a reduced Vout as well as severe reliability problems. The present invention is directed to ways to increase Vout without raising the operating temperature of the device above acceptable levels.

Referring now to FIG. 1, we show there the main features of a CCP-CPP GMR read head device. These are an antiferromagnetic (pinning) layer 12, which may include a a seed layer (not shown), pinned layer 14 (usually a tri-layer that acts as a synthetic AFM, but shown here as a single layer), a non-magnetic spacer layer 15 (which will be discussed further below), a free layer 16 and a capping layer 17 which may include a metallic gap layer (also not shown) directly below layer 11b.

When the free layer is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field. If the direction of the pinned field is parallel to the free layer, electrons passing between the free and pinned layers, suffer less scattering. Thus, the resistance at this state is lower. If, however, the magnetization of the pinned layer is antiparallel to that of the free layer, electrons moving from one layer into the other will suffer more scattering so the resistance of the structure will increase. The change in resistance of a spin valve is typically 5-15%.

In the foregoing discussion it was tacitly implied that non-magnetic spacer layer 15 is a homogenous layer of a single conductive material. In the CCP (current confined path) design, the spacer layer is actually a trilayer of two conductive layers (such as copper) with a very thin insulating layer (usually a nano-oxide layer) between them. The latter is typically between about 5 and 15 Angstroms thick, deliberately providing metal paths within itself. Thus, current through the spacer layer is confined to those areas where the two conductive layers contact one another via these metal paths (shown schematically in FIG. 1 as the hatched areas within layer 15).

It can be seen in FIG. 1 that current enters the device through lead 11a and exits through lead 11b (or vice versa if convention demands). It is, in general, preferable for 11a and 11b to be formed from the same material, most typically copper or gold, selected for their high electrical conductivity. In U.S. Patent Application 2004/0233584 (Liu et al), assigned to a common assignee as the current invention, it was shown that it can be advantageous, where feasible, to have top and bottom leads made of materials that have different thermoelectric powers, resulting in effective cooling of the GMR stack.

In a CCP device, RA (the resistance area product) can be adjusted in the range of 0.2-0.5 ohm.μm$^2$, compared to uniform metal spacer devices where RA is typically in the range 0.05-0.1 ohm.μm$^2$. As a consequence, DR/R can be improved to a level much higher than that attainable by a 'metallic' CPP device.

The down side of CCP designs is that the current density in the confined path can be much higher than the average current density. As a result, the spacer will be a hot spot during operation. Since DR/R is known to decrease with rising temperature, it becomes very important to cool the spacer during operation in order to extract the best possible performance from the device.

A routine search of the prior art was performed with the following references of interest being found:

U.S. Pat. No. 6,353,318 (Sin et al) discloses top and bottom leads made of the same material. In U.S. Pat. No. 6,597,544, Ghosal shows a cold plate thermally coupled to a thermoelectric cooler. U.S. Patent Application 2005/0052789 (Zhang et al), a Headway application, also shows the use of thermoelectric cooling leads. U.S. Pat. No. 5,627,704 (Lederman et al) and U.S. Pat. No. 5,668,688 (Dykes et al) show CPP mode read heads.

SUMMARY OF THE INVENTION

It has been an object of at least one embodiment of the present invention to incorporate thermoelectric cooling in a CCP/CPP GMR device thereby increasing its current carrying capability.

Another object of at least one embodiment of the present invention has been that said increased current cause an increased output voltage amplitude in a device such as a CPP GMR magnetic read head.

Still another object of at least one embodiment of the present invention has been that said thermoelectric cooling be achieved without the addition of any additional parts to the device or devices for which it is used.

A further object of at least one embodiment of the present invention has been that said thermoelectric cooling be capable of cooling a single micro-device without influencing its immediate neighbors.

Yet another object of at least one embodiment of the present invention has been to provide a process for manufacturing said cooling system.

It has been an object of at least one embodiment of the present invention to incorporate thermoelectric cooling in a CCP-CPP device, thus increasing the output voltage amplitude with no loss in reliability.

These objects have been achieved by placing materials that have different thermoelectric potentials on opposing sides of the spacer layer in a CCP/CPP device. More specifically, said materials are selected so that they differ significantly in their TEPs (thermoelectric powers). The result is that when DC is passed through the device hot and cold junctions are formed. Heat from the hot junction is removed at the substrate, which acts as a heat sink, resulting in a net local cooling of the device which enables it to operate at higher power. For a GMR device, this translates into a larger output voltage, making the device more sensitive, more reliable, and easier to use.

BRIEF DESCRIPTION OF THE DRAWINGS

FIG. 1 shows a CCP-CPP GMR device of the prior art.
FIG. 2 shows a CCP-CPP GMR device built according to the teachings of the present invention.

DESCRIPTION OF THE PREFERRED EMBODIMENTS

As discussed above, in an earlier invention we disclosed a method of selecting the bottom and top lead materials so as to create a net thermoelectric potential in the CPP device whereby, for a specific current flow direction, the heat generated from Joule heating could be removed more effectively and transferred efficiently to a heat sink. In the case of a CCP-CPP device, most of the Joule heating is generated in the spacer layer, where the local current density is very high, so it becomes very important to remove heat directly from the spacer layer, not just from the GMR stack as a whole. Additionally, it may sometimes be preferable to use the same material for both the top and bottom leads, making the application of the earlier invention impossible.

Thermoelectric phenomena have been well known since the Seebeck effect observed in 1826 and followed by the discovery of the Peltier and Thomson effects. Many activities have since been carried out for material thermoelectric emf and thermoelectric devices In TABLE I below, we give the thermoelectric emfs (potentials) of some metals at 100 and 200° C. relative to a platinum reference junction kept at 0° C.

TABLE I

| Material | EMF at 100° C. mV | EMF at 200° C. mV |
|---|---|---|
| Cu | 0.76 | 1.83 |
| Al | 0.42 | 1.06 |
| Ni | −1.48 | −3.10 |
| Pd | −0.57 | −1.23 |
| Ag | 0.74 | 1.77 |
| Alumel | −1.29 | −2.17 |
| Chromel | 2.81 | 5.96 |
| Constantan | −3.51 | −7.45 |
| Fe | 1.89 | 3.54 |
| $Pt_{90}Rh_{10}$ | 0.643 | 1.44 |

The key concept disclosed by the invention is to select materials in the CCP-CPP stack with net positive thermoelectric emf (+TEP) at one side of Spacer and net negative thermoelectric emf (−TEP) at the other side of Spacer. The resulting CCP-CPP device then incorporates the thermoelectric cooling effect as current flows from the stack side with (−TEP) through Spacer to the stack side with (+TEP).

Applicable materials with (+TEP) can be Cu, Chromel ($Ni_{90}Cr_{10}$), Cr, Ta, Ru, Fe, Mo, Au, Ag, Al or their alloy etc. Applicable materials with (−TEP) can be Ni, Constantan ($Ni_{43}Cu_{57}$), NiFe, Co, Pt, Pd or their alloy etc. As long as a net thermoelectric emf is present, thermoelectric cooling exists for the appropriate current direction.

For our head design, S1 and S2 use the same material (usually with −TEP) and current flows in the positive direction (from S2 to S1). So we would like to create TEC effect in favor of current flow from capping layer, Free Layer to Spacer to Pinned layer, AFM and Seed layer. This means to select materials with net (−TEP) for Capping and Free Layer to top Spacer and net (+TEP) from bottom Spacer to Pinned layer, AFM and seed layer. Experiments confirm that positive current shows more cooling than negative current. The temperature difference at the operating voltage BHV (Buffer Head Voltage) of 120 mV between Positive and Negative current is summarized in TABLE II. The temperature coefficient of DR/R is −0.19%/° C. and the amplitude gain by Positive current flow is −13% compared to without this TEC effect. There is also gain in long term reliability.

TABLE II

| Wafer | Temperature Delta @ BHV +120 mV | Temperature Delta @ BHV −120 mV | Cooling Effect from Positive BHV | Amplitude Gain from Cooling |
|---|---|---|---|---|
| 47579 | 10° C. | 70° C. | 30° C. | 5.7% |
| 4793J | −10° C. | 130° C. | 70° C. | 13.3% |

We will now describe the invention in greater detail. We have chosen to use a CCP-CPP GMR structure as our exemplary vehicle but it will be understood that the invention is more general than this and could be applied to any layered structure, that is operated either wholly or in part by direct current, where very local cooling of a specific layer within that structure is required.

Referring now to FIG. 2, the process of the present invention begins with the provision of heat sink 21 (usually the substrate) on which rests lower lead S1 made of a layer of conductive material, such as NiFe, which is deposited (to a thickness of between about 0.1 and 3 microns) and then suitably patterned.

Antiferromagnetic layer 12 is then deposited on lower conducting lead S1 followed by pinned layer 24 which is made of a material having a positive thermoelectric potential. Possible materials to use for the pinned layer include Fe rich CoFe. Next is deposited CCP spacer layer 25 which is formed, as discussed earlier, by sandwiching an insulating layer that has metal paths between two conductive layers.

Free layer 26 is then deposited on said CCP spacer layer 25 followed by capping layer 27. Either free layer 26 or capping layer 27 is formed from a material having a negative thermoelectric potential. Possible choices for this include Co rich CoFe and NiFe if it is used for the free layer, or Ru or NiCu if it is used for the capping layer.

With the capping layer in place a second layer of a conductive material is deposited and patterned to become upper conducting lead S2, which concludes the process.

CCP-CPP devices have been built with different stack configurations. Current stress and temperature rise tests have been conducted on the devices. Thermoelectrically assisted cooling effects have been evaluated for a number of configurations. Through stack material selection and design, at operating BHV 120 mV, the temperature difference between positive current (from S2 to S1) vs negative current (from S1 to S2) up to 140° C. has been achieved. Thus, by applying positive current, at the operating BHV, the device runs 70° C. cooler than a device without the thermoelectrically assisted cooling scheme of the invention

What is claimed is:

1. A method to cool a specific layer located within a multi-layer stack, comprising:
   providing a heat sink and disposing said stack to be above, and thermally connected to, said heat sink;
   placing a layer having a negative thermoelectric potential above said specific layer, as part of said stack;
   placing a layer having a positive thermoelectric potential above said heat sink and below said specific layer; and
   thereby cooling said specific layer when positive electric charge flows from said layer having a negative thermoelectric potential to said layer having a positive thermoelectric potential.

2. The method described in claim 1 wherein said layer having a negative thermoelectric potential is selected from the group consisting of NiCu, NiFe, Ni, Go, Pd, Pt, PdAg, PtRh, NiCo, YbAI$_3$, CoSi, CoNiSi, and NiMnAISi.

3. The method described in claim 1 wherein said layer having a positive thermoelectric potential material is selected from the group consisting of NiCr, Mo, W, Cu, Ag Au, U, V, Yb, NiMo, and CePd$_3$.

4. The method described in claim 1 wherein said multi-layer stack is a magnetic read element.

5. The method described in claim 4 wherein said specific layer is a non-magnetic spacer layer.

6. A process to manufacture a CCP-CPP magnetic read head comprising:
   providing a heat sink;
   depositing on said heat sink a layer of conductive material and then patterning said conductive layer to form a lower conducting lead;
   depositing an antiferromagnetic layer on said lower conducting lead;
   depositing, on said antiferromagnetic layer, a pinned layer of a material having a positive thermoelectric potential;
   depositing a first non-magnetic conductive layer on said pinned layer;
   depositing, on said first non-magnetic conductive layer, an insulating layer in which there are metal paths;
   depositing a second non-magnetic conductive layer on said insulating layer, thereby forming a CCP spacer layer on said pinned layer;
   depositing a free layer on said CCP spacer layer;
   depositing a capping layer on said free layer; and
   depositing on said capping layer a layer of a conductive material and patterning said layer of conductive material to form an upper conducting lead, thereby forming said CCP-CPP magnetic read head.

7. The process described in claim 6 wherein said insulating layer in which there are metal paths is a nano-oxide layer.

8. The process described in claim 6 wherein said free layer is selected from the group consisting of materials with negative thermoelectric power and said pinned layer is selected from the group consisting of materials with positive thermoelectric power, for positive charge flowing from said upper conducting lead to said lower conducting lead.

9. The process described in claim 6 wherein said upper and lower conductive leads are formed of the same material.

10. A process to manufacture a CCP-CPP magnetic read head comprising:
    providing a heat sink;
    depositing on said heat sink a layer of conductive material and then patterning said conductive layer to form a lower conducting lead;
    depositing on said lower conducting lead an antiferromagnetic layer of material having a positive thermoelectric potential;
    depositing a pinned layer on said antiferromagnetic layer;
    depositing a first non-magnetic conductive layer on said pinned layer;
    depositing, on said first non-magnetic conductive layer, an insulating layer in which there are metal paths;
    depositing a second non-magnetic conductive layer on said insulating layer, thereby forming a CCP spacer layer on said pinned layer;
    depositing a free layer on said CCP spacer layer;
    depositing, on said free layer, a capping layer of a material having a negative thermoelectric potential; and
    depositing on said capping layer a layer of a conductive material and patterning said layer of conductive material to form an upper conducting lead, thereby forming said CCP-CPP magnetic read head.

11. The process described in claim 10 wherein said insulating layer in which there are metal paths is a nano-oxide layer.

12. The process described in claim 10 wherein said capping layer is selected from the group consisting of materials having a negative thermoelectric power and said anti-ferromagnetic layer is selected from the group consisting of materials with positive thermoelectric power, for positive charge flowing from said upper conducting lead to said lower conducting lead.

13. The process described in claim 10 wherein said upper and lower conductive leads are formed of the same material.

14. A magnetic read head, comprising:
    a heat sink;
    on said heat sink, a lower conducting lead;
    an antiferromagnetic layer on said lower conducting lead;
    a pinned layer, having a negative thermoelectric potential, on said antiferromagnetic layer;
    a CCP-CPP spacer layer on said pinned layer;
    a free layer, having a positive thermoelectric potential, on said non-magnetic layer;
    a capping layer on said free layer; and
    an upper conductive lead on said capping layer.

15. The magnetic read head described in claim 14 wherein said free layer is selected from the group consisting of materials having a positive thermoelectric power and said pinned layer is selected from the group consisting of materials with negative thermoelectric power, for positive charge flowing from said lower conducting lead to said upper conducting lead.

16. The magnetic read head described in claim 14 wherein said upper and lower conductive leads are formed of the same material.

17. A magnetic read head, comprising:
    a heat sink;
    on said heat sink, a lower conducting lead;
    on said lower conducting lead, an antiferromagnetic layer having a negative thermoelectric potential;
    a pinned layer on said antiferromagnetic layer;
    a CCP-CPP spacer layer on said pinned layer;
    a free layer on said non-magnetic layer;
    a capping layer, having a positive thermoelectric potential, on said free layer; and
    an upper conductive lead on said capping layer.

18. The magnetic read head described in claim 17 wherein said capping layer is selected from the group consisting of materials having a positive thermoelectric potential and said antiferromagnetic layer is selected from the group consisting of materials with negative thermoelectric power, for positive charge flowing from said lower conducting lead to said upper conducting lead.

19. The magnetic read head described in claim 17 wherein said upper and lower conductive leads are formed of the same material.

20. The magnetic read head described in claim 17 wherein a Vout value is achieved that is about 13% higher than that of a comparable device that has no built-in thermo-electric cooling.

* * * * *